US011384669B2

(12) United States Patent
Swaroop et al.

(10) Patent No.: US 11,384,669 B2
(45) Date of Patent: Jul. 12, 2022

(54) INTEGRATED BASE FILTER FOR A DEF MANIFOLD

(71) Applicant: Caterpillar Inc., Deerfield, IL (US)

(72) Inventors: Govind Swaroop, Dunlap, IL (US); Raghuram Gaikwad, Peoria, IL (US); Scott Frederick Meyer, Eureka, IL (US); Bogdan Balea, Peoria, IL (US); Shawn Richard Herold, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 549 days.

(21) Appl. No.: 16/510,558

(22) Filed: Jul. 12, 2019

(65) Prior Publication Data
US 2021/0010406 A1     Jan. 14, 2021

(51) Int. Cl.
| | | |
|---|---|---|
| *B01D 47/00* | (2006.01) |
| *F01N 3/20* | (2006.01) |
| *B01D 35/18* | (2006.01) |
| *B01D 35/30* | (2006.01) |
| *B01D 35/027* | (2006.01) |
| *B01D 29/15* | (2006.01) |

(52) U.S. Cl.
CPC ........... *F01N 3/2066* (2013.01); *B01D 29/15* (2013.01); *B01D 35/0276* (2013.01); *B01D 35/18* (2013.01); *B01D 35/30* (2013.01); *B01D 2201/0446* (2013.01); *B01D 2201/4023* (2013.01); *B01D 2201/4038* (2013.01); *F01N 2610/02* (2013.01); *F01N 2610/10* (2013.01); *F01N 2610/1406* (2013.01); *F01N 2610/1426* (2013.01); *F01N 2610/1486* (2013.01)

(58) Field of Classification Search
CPC ... B01D 35/30; B01D 35/0276; F01N 3/2066; F01N 2610/1406
USPC ......................................................... 55/421
See application file for complete search history.

(56) References Cited

U.S. PATENT DOCUMENTS

| 5,564,177 | A | 10/1996 | Fernandes et al. |
| 5,770,073 | A | 6/1998 | Bach et al. |
| 7,468,082 | B2 | 12/2008 | Gordon |

(Continued)

FOREIGN PATENT DOCUMENTS

| GB | 1549825 | 8/1979 |
| WO | WO2015117117 A1 | 8/2015 |

*Primary Examiner* — Long T Tran
*Assistant Examiner* — James J Kim
(74) *Attorney, Agent, or Firm* — von Briesen & Roper, s.c.

(57) ABSTRACT

A base filter for a diesel exhaust fluid (DEF) filter of a header assembly in a fluid reservoir is disclosed may include first and second semi-cylindrical holder portions having a semi-cylindrical walls concluding at abutment surfaces that face and engage when the base filter is assembled. The semi-cylindrical holder portions have one or more mounting tabs extending inward from inner surfaces of the semi-cylindrical walls. The header assembly may include a header with a cylindrical header boss having mounting recess defined therein. The mounting tabs may be circumferentially spaced about the semi-cylindrical walls to align with and be inserted into the mounting recesses of the header boss the base filter is assembled on the cylindrical header boss. Fasteners may be inserted through fastener bosses of the semi-cylindrical holder portions and into fastener bores of the header boss to hold the semi-cylindrical holder portions together and on the header.

20 Claims, 5 Drawing Sheets

(56) References Cited

U.S. PATENT DOCUMENTS

| | | | |
|---|---|---|---|
| 9,248,390 B2* | 2/2016 | Hudgens | B01D 29/117 |
| 2015/0023843 A1 | 1/2015 | Driscoll et al. | |
| 2015/0275732 A1 | 10/2015 | Yong et al. | |
| 2016/0290520 A1* | 10/2016 | Memmer | F16K 31/22 |
| 2017/0122170 A1* | 5/2017 | Fahrenkrug | B01D 35/0276 |
| 2017/0189837 A1 | 7/2017 | Herold et al. | |
| 2018/0094562 A1 | 4/2018 | Kruse et al. | |
| 2018/0252134 A1 | 9/2018 | Leger et al. | |

* cited by examiner

INTEGRATED BASE FILTER FOR A DEF MANIFOLD

TECHNICAL FIELD

The present disclosure relates generally to diesel exhaust fluid (DEF) delivery systems used in association with engine emission control systems and, more particularly, to an integrated base filter in a DEF manifold for preventing collapse of a DEF filter and interference with a DEF level float sensor.

BACKGROUND

One known method for abating certain diesel engine exhaust constituents is by use of an exhaust after-treatment system that utilizes selective catalytic reduction (SCR) of nitrogen oxides. In a typical SCR system, diesel exhaust fluid, which may include urea or a urea-based water solution, is mixed with exhaust gas before being provided to an appropriate catalyst. In some applications, the diesel exhaust fluid is injected directly into an exhaust passage through a specialized injector device. The injected diesel exhaust fluid mixes with exhaust gas and breaks down to provide ammonia ($NH_3$) in the exhaust stream that reacts with nitrogen oxides (NOx) in the exhaust at a catalyst to provide nitrogen gas ($N_2$) and water ($H_2O$).

In known DEF injection systems, a reservoir for the diesel exhaust fluid is installed on a vehicle, and the diesel exhaust fluid is drawn from the reservoir and delivered in metered amounts to the engine exhaust system. Refilling or replenishment operations for the DEF reservoir are typically carried out through a removable reservoir cap. Dirt and other debris may fall within the reservoir during a refilling operation, and can present problems if the dirt and other debris are ingested into a pump drawing diesel exhaust fluid from the reservoir and delivered with the diesel exhaust fluid to the DEF injector, which can cause small orifices to bind or become plugged by the debris.

Various solutions have been proposed to mitigate the presence of debris within a DEF container. One known filter system and filtration method for a DEF reservoir is disclosed in U.S. Pat. No. 9,248,390 to Hudgens et al. The fluid delivery system in the Hudgens et al. patent includes a fluid reservoir having an inlet screen and a main reservoir filter. The fluid reservoir includes a reservoir body forming a reservoir volume that is fluidly connected to an inlet conduit, a supply conduit, and a return conduit. The inlet screen is disposed fluidly along the inlet conduit and adapted to filter a fluid provided to fill the reservoir through the inlet conduit. The main reservoir filter is a bag or sock-type DEF filter that is disposed fluidly along the supply conduit and adapted to filter a fluid drawn from the reservoir volume and provided through the supply conduit to a pump.

SUMMARY OF THE DISCLOSURE

In one aspect of the present disclosure, a base filter for a DEF filter of a header assembly in a fluid reservoir is disclosed. The header assembly may include a header having a cylindrical header boss with a boss outer surface having a first mounting recess, a second mounting recess, a third mounting recess and a fourth mounting recess defined therein. The base filter may include a first semi-cylindrical holder portion having a first semi-cylindrical wall with a first upper edge surface, the first semi-cylindrical wall concluding at a first abutment surface and a second abutment surface, wherein the first semi-cylindrical holder portion has a first mounting tab and a second mounting tab extending inward from an inner surface of the first semi-cylindrical wall proximate the first upper edge surface. The base filter may also include a second semi-cylindrical holder portion having a second semi-cylindrical wall with a second upper edge surface, the second semi-cylindrical wall concluding in a third abutment surface and a fourth abutment surface, wherein the second semi-cylindrical holder portion has a third mounting tab and a fourth mounting tab extending inward from an inner surface of the second semi-cylindrical wall proximate the second upper edge surface. The first mounting tab and the second mounting tab may be circumferentially spaced about the first semi-cylindrical wall to align with and be inserted into the first mounting recess and the second mounting recess, respectively, of the boss outer surface, and the third mounting tab and the fourth mounting tab may be circumferentially spaced about the second semi-cylindrical wall to align with and be inserted into the third mounting recess and the fourth mounting recess, respectively, of the boss outer surface.

In another aspect of the present disclosure, a header assembly insertable into a fluid reservoir for reductant fluid is disclosed. The header assembly may include a header including a header flange having a flange outer diameter, and a header boss descending from the header flange having a boss outer surface with a boss outer diameter that is less than the flange outer diameter of the header flange, the boss outer surface having a first mounting recess and a second mounting recess defined therein. The header assembly may further include a base filter and a DEF filter secured to the base filter and descending from the header. The base filter may include a first semi-cylindrical holder portion having a first semi-cylindrical wall with a first upper edge surface, the first semi-cylindrical wall concluding at a first abutment surface and a second abutment surface, wherein the first semi-cylindrical holder portion has a first mounting tab extending inward from an inner surface of the first semi-cylindrical wall proximate the first upper edge surface. The base filter may further include a second semi-cylindrical holder portion having a second semi-cylindrical wall with a second upper edge surface, the second semi-cylindrical wall concluding in a third abutment surface and a fourth abutment surface, and wherein the second semi-cylindrical holder portion has a second mounting tab extending inward from an inner surface of the second semi-cylindrical wall proximate the second upper edge surface. The first mounting tab and the second mounting tab may be circumferentially spaced about the first semi-cylindrical wall and the second semi-cylindrical wall, respectively, to align with and be inserted into the first mounting recess and the second mounting recess, respectively, of the boss outer surface when the base filter is assembled on the header boss with the first abutment surface facing and engaging the third abutment surface and the second abutment surface facing and engaging the fourth abutment surface.

In a further aspect of the present disclosure, a base filter for a DEF filter of a header assembly in a fluid reservoir is disclosed. The header assembly may include a header having a cylindrical header boss with a boss outer surface having a first mounting recess and a second mounting recess defined therein. The base filter may include a first semi-cylindrical holder portion having a first semi-cylindrical wall concluding at a first abutment surface and a second abutment surface, wherein the first semi-cylindrical holder portion has a first mounting tab extending inward from an inner surface of the first semi-cylindrical wall. The base filter may further include a second semi-cylindrical holder portion having a second semi-cylindrical wall concluding in a third abutment surface and a fourth abutment surface, wherein the second semi-cylindrical holder portion has a second mounting tab extending inward from an inner surface of the second semi-cylindrical wall. The first mounting tab and the second mounting tab may be circumferentially spaced about the first semi-cylindrical wall and the second semi-cylindrical wall to align with and be inserted into the first mounting recess and the second mounting recess, respectively, of the boss outer surface when the base filter is assembled on the cylindrical header boss with the first abutment surface facing and engaging the third abutment surface and the second abutment surface facing and engaging the fourth abutment surface.

Additional aspects are defined by the claims of this patent.

DETAILED DESCRIPTION

This disclosure relates to emission control systems for machines and, more particularly, to reductant filtering systems for use with SCR-based after-treatment systems for diesel engines used on stationary or mobile machines. The machines contemplated in the present disclosure can be used in a variety of applications and environments. For example, any machine that performs some type of operation associated with an industry such as mining, construction, farming, transportation, marine or any other industry known in the art is contemplated. For example, the type of machine contemplated herein may be an earth-moving machine, such as a wheel loader, excavator, dump truck, backhoe, material handler, locomotive, paver or the like. Apart from mobile machines, the machine contemplated may be a stationary or portable machine such as a generator set, an engine driving a gas compressor or pump, and the like. Moreover, the machine may include or be associated with work implements such as those utilized and employed for a variety of tasks, including, for example, loading, compacting, lifting, brushing, and include, for example, buckets, compactors, forked lifting devices, brushes, grapples, cutters, shears, blades, breakers/hammers, augers, and others.

Figure 1:
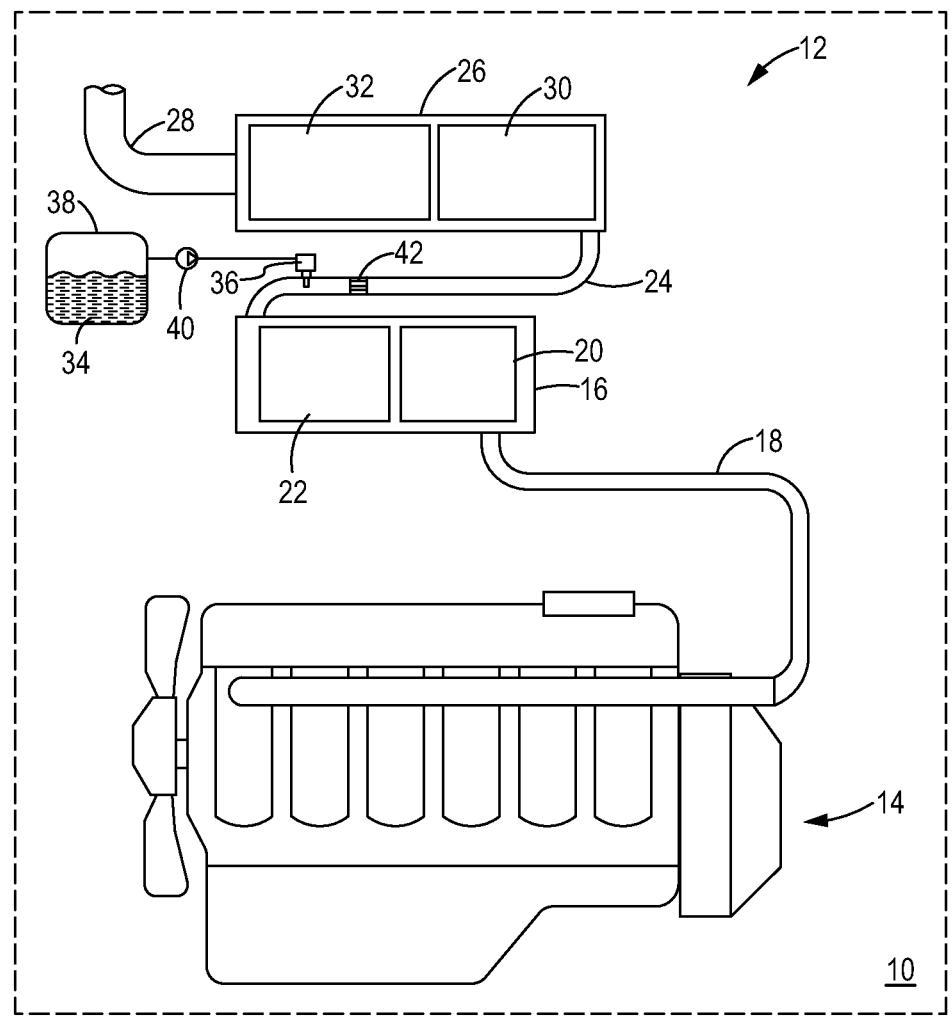
FIG. 1 is a schematic block diagram of an internal combustion engine coupled to an exhaust aftertreatment system including a DEF reservoir with an integrated base filter in accordance with the present disclosure.

Referring to the drawings, wherein like reference numbers refer to like elements, FIG. 1 is a representative block diagram of a machine 10 having an exhaust aftertreatment system 12 associated with an internal combustion engine 14 of the machine 10. The internal combustion engine 14 is designed to combust a hydrocarbon-based fuel such as diesel or gasoline and convert the potential chemical energy therein to mechanical power in the form of rotational motion. In the illustrated embodiment, the engine 14 may be a compression ignition diesel engine, but in other embodiments may be a spark ignition gasoline engine, a gas turbine, etc. The aftertreatment system 12 may be modularly packaged as shown in the illustrated embodiment for retrofit onto existing engines or, alternatively, for installation on new engines. In the illustrated embodiment, the aftertreatment system 12 includes a first aftertreatment module 16 that is fluidly connected to an exhaust conduit 18 from the engine 14. During engine operation, the first aftertreatment module 16 is arranged downstream of the engine 14 to internally receive engine exhaust gas from the exhaust conduit 18. The first aftertreatment module 16 may contain various exhaust gas treatment devices such as a diesel oxidation catalyst (DOC) 20 and a diesel particulate filter (DPF) 22, but other devices may be used. The first aftertreatment module 16 and the components found therein are optional and may be omitted for various engine applications in which the exhaust-treatment function provided by the first aftertreatment module 16 is not required.

A transfer conduit 24 fluidly interconnects the first aftertreatment module 16 with a second aftertreatment module 26 such that exhaust gas from the engine 14 may pass through the aftertreatment modules 16, 26 in series before being released to the environment from a stack 28 that is connected to the second aftertreatment module 26. In the illustrated embodiment, the second aftertreatment module 26 encloses an SCR catalyst 30 and an ammonia oxidation catalyst (AMOX) 32. The SCR catalyst 30 and the AMOX 32 operate to treat exhaust gas from the engine 14 in the presence of ammonia, which is provided after degradation of a fluid reductant 34, such as diesel exhaust fluid, is injected into the exhaust gas in the transfer conduit 24. The fluid reductant 34 is injected into the transfer conduit 24 by a reductant injector 36. The fluid reductant 34 is contained within a tank-like DEF reservoir 38 and is provided to the reductant injector 36 by a pump 40. As the fluid reductant 34 is injected into the transfer conduit 24, it mixes with exhaust gas passing there through and is transferred therewith to the second aftertreatment module 26. To promote mixing of reductant with the exhaust gas, a mixer 42 comprised of baffles may be disposed along the transfer conduit 24.

One issue that may arise during operation is ingestion of dirt and/or other debris that may be found within the DEF reservoir 38. Because urea may freeze, the inlet port within the DEF reservoir 38 and other similar reservoirs is close to the bottom of the DEF reservoir 38 such that the fluid reductant 34 may be drawn even if frozen urea is still present and floating in the DEF reservoir 38 when operation of the engine 14 starts and a heater disposed within the DEF reservoir 38 has not yet melted the entire amount of the fluid reductant 34 held in the DEF reservoir 38. However, drawing fluid reductant 34 from the bottom of the DEF reservoir 38 for this reason also makes the aftertreatment system 12 more susceptible to ingestion of debris, dirt or other contaminants that may be present within the DEF reservoir 38, for example, by falling into the DEF reservoir 38 through a fill-port opening during a filling operation.

Figure 2:
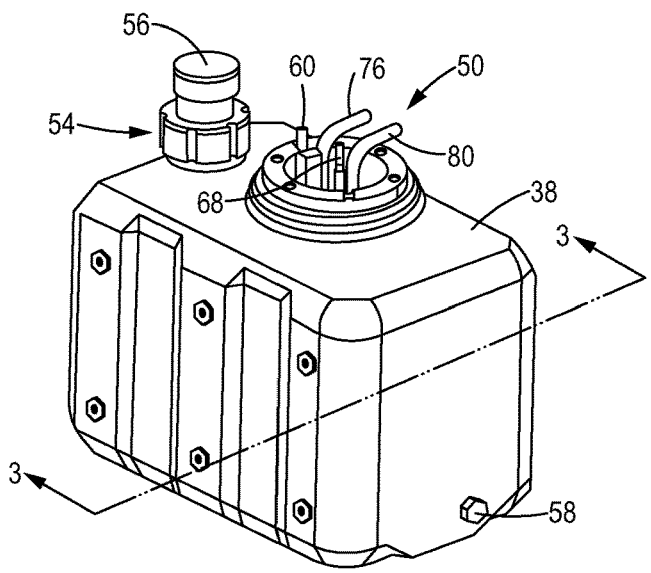
FIG. 2 is a perspective view of the DEF reservoir of the exhaust aftertreatment system of FIG. 1.
Figure 3:
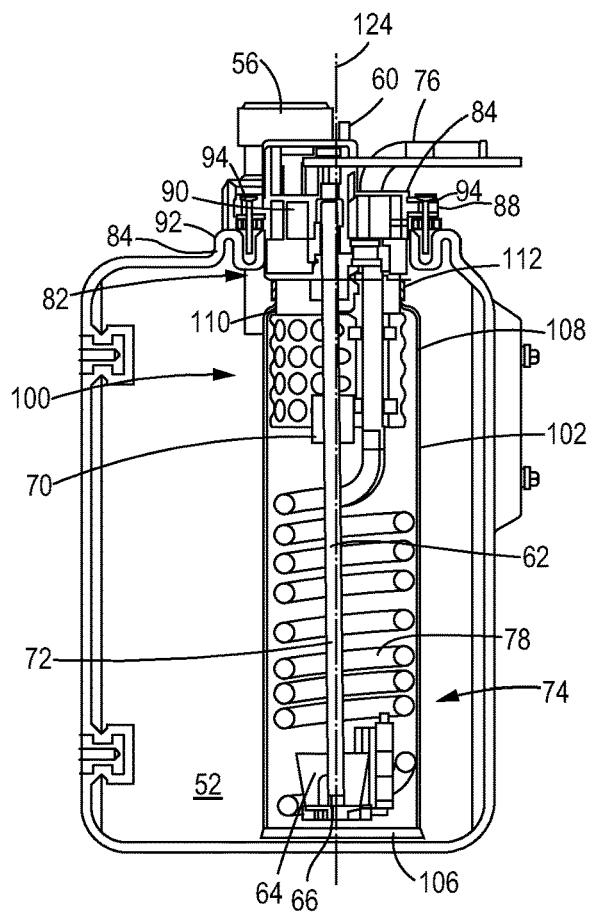
FIG. 3 is a cross-sectional elevational view of the DEF reservoir taken along line 3-3 of FIG. 2 and illustrating a header assembly having an embodiment of the integrated base filter in accordance with the present disclosure.

A more detailed illustration of an embodiment of the DEF reservoir 38 is provided in FIGS. 2 and 3. To communicate the fluid reductant 34 to the SCR catalyst 30 of the second aftertreatment module 26, the DEF reservoir 38 includes a header assembly 50 installed on the top of the DEF reservoir 38 that is configured with various inlet and outlet tubes. The DEF reservoir 38 shown is a single-piece molded plastic structure defining a generally hollow, internal reservoir volume 52 of suitable volume to hold a quantity of the fluid reductant 34 for sustained treatment of the exhaust gasses. To fill the DEF reservoir 38 with the fluid reductant 34, the reservoir volume 52 can be accessed through a fill opening 54 sealed by a removable fill cap 56 and to drain the reservoir volume 52, a drain plug 58 can be disposed toward the bottom of the DEF reservoir 38.

The header assembly 50 accommodates the inlet and outlet tubes for directing fluids to and from the reservoir volume 52. For example, to supply reductant to the SCR catalyst 30 via the reductant injector 36 and pump 40 (FIG. 1), the header assembly 50 includes a reductant supply port 60 disposed externally of the DEF reservoir 38 and which forms part of a reductant supply tube 62 directed into the reservoir volume 52. To ensure the reductant supply tube 62 has access to the fluid reductant 34, the reductant supply tube 62 may extend to a sump 64 located at the bottom of the reservoir volume 52. The sump 64 may include an inlet filter 66 to remove debris and contaminants from the fluid reductant 34 before they enter the supply tube 62. Likewise, to receive excess fluid reductant 34 that may be returned from the SCR catalyst 30, the header assembly 50 may include a reductant return port 68 that can discharge returning fluid reductant 34 proximate the top of the reservoir volume 52. In an embodiment, to measure the quantity of the fluid reductant 34 in the DEF reservoir 38, a reductant level sensor 70 slidably disposed on a sensor rod 72 can be installed in the reservoir volume 52 extending coaxially around and parallel to the supply tube 62. The reductant level sensor 70 can float on top of the fluid reductant 34 and make readings or measurements with respect to the sensor rod 72 that indicate the quantity of the fluid reductant 34 in the reservoir volume 52.

Because the machine 10 on which the DEF reservoir 38 is included may be exposed to very cold outdoor temperatures, the header assembly 50 can accommodate a heater device 74 to prevent the fluid reductant 34 from freezing. In the illustrated embodiment, the heater device 74 can be a liquid-to-liquid heat exchanger that uses heat provided by a flow of warm engine coolant to thaw frozen fluid reductant 34 in the DEF reservoir 38. Although a coolant-operated heater device 74 is shown, other types of heaters such as electrically powered or exhaust-gas heat powered heaters, for example, may be used. The coolant-operated heater device 74 includes a coolant inlet conduit 76 that supplies warmed coolant from the engine 14 to a helical element or tubular heater coil 78, which is disposed within the reservoir volume 52 and in contact with the fluid reductant 34 therein. Coolant provided through the coolant inlet conduit 76 passes through the heater coil 78, thus heating the fluid reductant 34. From the heater coil 78, the flow of coolant may return to the engine 14 through a coolant outlet conduit 80.

To insert the header assembly 50 and the tubes it accommodates into the DEF reservoir 38, a header opening 82 can be disposed through the top of the DEF reservoir 38 that provides access to the reservoir volume 52. The header opening 82 can be disposed through a reservoir embossment 84 of thicker or reinforced material formed on the external surface of the DEF reservoir 38. To cooperatively mate with the header opening 82, the header assembly 50 can include a header 86 having a header flange 88 and a header boss 90 protruding or extending from the header flange 88. The header 86 may be made of molded plastic or machined metal, and may fix the location of the inlet and outlet tubes disposed through the header 86 when installed in the header opening 82. In the illustrated embodiment, the header flange 88 and the header boss 90 may be circular in shape and may have a flange outer diameter and a boss outer diameter, respectively, with the boss outer diameter being less than the flange outer diameter. However, in other embodiments, other shapes for the header flange 88 and the header boss 90 are possible. When installed on the DEF reservoir 38, the header flange 88 can be supported on a shoulder 92 formed by the reservoir embossment 84 externally of the DEF reservoir 38, and the header boss 90 can be received into the header opening 82 such that the supply tube 62, sensor rod 72, and heater device 74 descend into the reservoir volume 52. The reservoir embossment 84 can have a circular shape with a diameter correspond to that of the header flange 88, and the header opening 82 can be circular and have a diameter dimensioned to form a sliding fit with the header boss 90. The header assembly 50 is thus the primary conduit for fluid communication into and out of the DEF reservoir 38. The header assembly 50 may be removably mounted to the DEF reservoir 38 by a plurality of threaded fasteners 94 that can pass through fastener bores 96 (FIG. 4) in the header 86 and thread into complementary threaded holes in the reservoir embossment 84.

Figure 4:
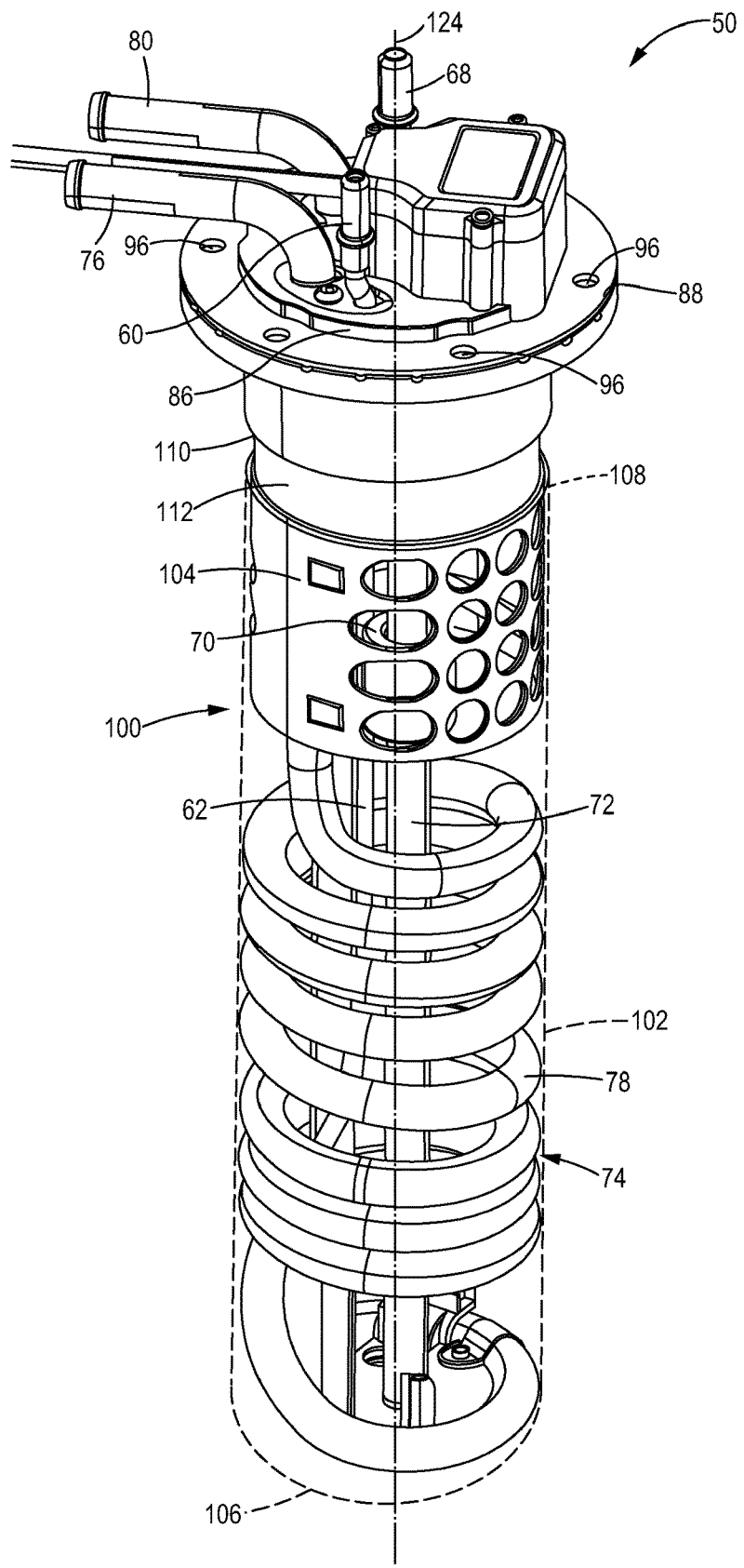
FIG. 4 is a perspective view of the header assembly of FIG. 3 with a DEF filter of the header assembly indicated by hidden lines.

To remove debris, contaminants, or ice suspended in the fluid reductant 34 and to protect the extended supply tube 62 and the heater device 74, a filtration assembly 100 including a DEF filter 102 and an integrated base filter 104 can be secured to the underside of the header assembly 50 and descend into the reservoir volume 52. Referring to FIGS. 3 and 4, the filtration assembly 100 and method of securing it to the header assembly 50 is better illustrated. The DEF filter 102 may have a tubular, bag-, sleeve- or sock-like configuration of flexible or pliable material that is elongated and extends coextensively with the supply tube 62 and the heater device 74 to surround and enclose them. To provide the tubular shape, the DEF filter 102 can have a closed end 106 and a mouth or DEF filter opening 108 opposite the closed end 106. In an embodiment, the material of the DEF filter 102 can include supports or stitching to assist maintaining the tubular shape. The DEF filter 102 can be made of a layer of polypropylene felt fabric or material having a porosity of about 30 μm to 40 μm. The porosity of the DEF filter 102 depends on the size of the debris expected to be present in the DEF reservoir 38, and can change accordingly to be any size, although it may generally be expected for the porosity to be between 1 μm and 50 μm. In certain embodiments, the polypropylene material may be replaced by a different material that is resistant to the type of fluid reductant 34 that will be filtered. Even further, although a single layer material is shown here for the DEF filter 102, multiple layers or plies can be used. A flat sheet of fabric may be cut and sewn into the appropriate shape for the DEF filter 102, the DEF filter 102 may be woven into a tubular shape by use of a sock knitting-type machine using polypropylene fibers and yarn, or other fabrication methods may be used to form the DEF filter 102.

When secured to the header assembly 50, the DEF filter 102 may define an internal cavity or void dimensionally corresponding to the heater coil 78 of the heater device 74. Hence, when installed over the heater device 74, the heater coil 78 expands the DEF filter 102 and keeps the DEF filter 102 from collapsing under the influence of reductant flow being drawn into the supply tube 62 for removal from the DEF reservoir 38 in the lower area of the reservoir volume 52. This also prevents the DEF filter 102 from being drawn into and contacting the supply tube 62 and the sump 64. During operation, the fluid reductant 34 can flow or permeate through the DEF filter 102 from the surrounding reservoir volume 52 to access the supply tube 62 through the inlet filter 66, thereby filtering and removing debris and contamination from the fluid reductant 34. The inlet filter 66 may have a smaller porosity than the DEF filter 102 to capture smaller particles that are able to pass through the DEF filter 102 or ice crystals that may form in the fluid reductant 34 inside the DEF filter 102 during cold conditions. The heater coil 78 may also keep the DEF filter 102 from collapsing around and interfering with the reductant level sensor 70 on the sensor rod 72 that can be concentrically located within the heater coil 78 when the level of the fluid reductant 34 in the reservoir volume 52 is relatively low. Hence, the heater coil 78 prevents the DEF filter 102 from interfering with the reductant quantity measurements when the level of the fluid reductant 34 is below the top of the heater coil 78.

To further assist the DEF filter 102 in maintaining the expanded shape as well as securing the DEF filter 102 to the header 86, the filtration assembly 100 can include a base filter 104 that is partially disposed within the DEF filter opening 108 of the DEF filter 102 and mounted to the header boss 90 of the header 86. The base filter 104 has a hollow, generally cylindrical shape that corresponds to the cylindrical shape of the DEF filter 102. An outer diameter of the base filter 104 is configured to fit within an inner diameter of the DEF filter 102 and help the DEF filter 102 retain its shape during operation. Because the DEF filter 102 in the configuration shown extends over and around the heater coil 78, the base filter 104 need not extend along the entire longitudinal length of the cylindrical DEF filter 102 due to the internal support provided by the heater coil 78 as described above.

To secure the filtration assembly 100 to the header assembly 50, the base filter 104 is adapted for connection to and alignment on the header 86 and for attachment of the DEF filter 102 thereto. The base filter 104 may have a cylindrical configuration with a base filter inner diameter that corresponds in dimension to a header boss outer diameter of the header boss 90 so that the base filter 104 can be installed thereon. A base filter outer diameter is dimensioned to be received into the DEF filter opening 108 of the DEF filter 102. The outer surface of the base filter 104 may include an annular clamp groove 110 having a smaller outer diameter. The DEF filter opening 108 may be pulled over the clamp groove 110, and then a band clamp 112 or other clamping device may be tightened down on the DEF filter opening 108 and the clamp groove 110 to secure the DEF filter 102 to the base filter 104.

Figure 5:
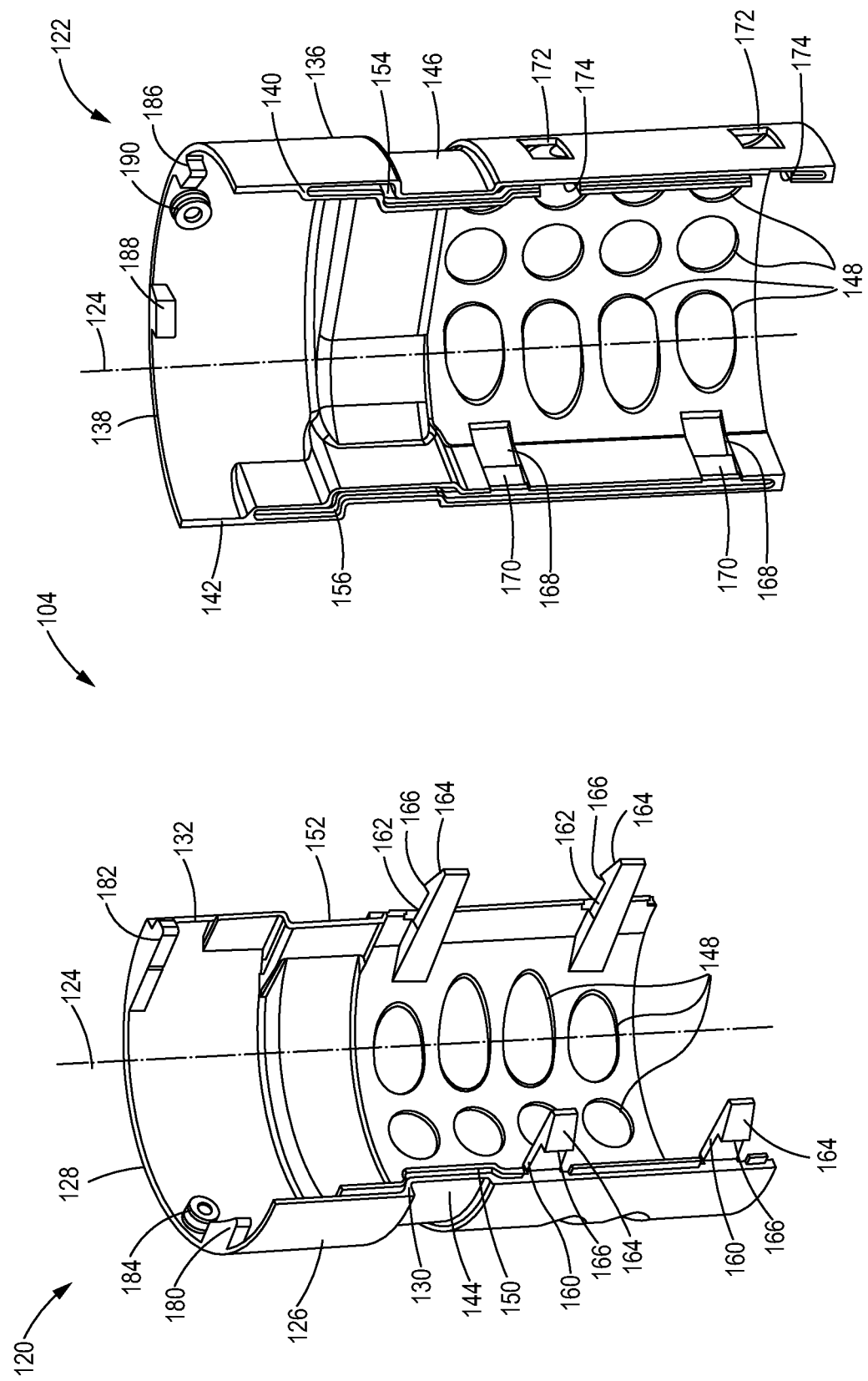
FIG. 5 is a perspective view of a first semi-cylindrical holder portion and a second semi-cylindrical holder portion of the integrated base filter of the header assembly of FIG. 3.

To facilitate assembly to the header 86, the base filter 104 can have a two-piece, clamshell type construction as indicated in the embodiment shown in FIG. 5. The base filter 104 is composed of a first semi-cylindrical holder portion 120 and a second semi-cylindrical holder portion 122 that is complementary with the first semi-cylindrical holder portion 120 to provide the overall cylindrical shape of the base filter 104. It should be noted that shapes and geometries are by way of example only and the semi-cylindrical holder portions 120, 122 may have other suitable shapes to correspond with the header opening 82 of the DEF reservoir 38 and the header boss 90. Further, although the illustrated semi-cylindrical holder portions 120, 122 are roughly hemispherical and each compose approximately 180° of the cylindrical base filter 104, in other embodiments, the semi-cylindrical holder portions 120, 122 may compose different degrees or arcs of the cylindrical base filter 104. The semi-cylindrical holder portions 120, 122 may be made from molded thermoplastic material, possibly reinforced with fiberglass, though in other embodiments the holder portions can be made from other suitable materials such as cast, sintered or machined metal that will not degrade due to the corrosive nature of some reductant agent formulations.

When assembled together to produce the base filter 104, as illustrated in FIG. 4, the first semi-cylindrical holder portion 120 and the second semi-cylindrical holder portion 122 are positioned adjacent to each other and disposed underneath the header 86. The semi-cylindrical shape of the semi-cylindrical holder portions 120, 122 combine to provide the circular configuration for the filtration assembly 100 corresponding to the circular closed end 106 and the DEF filter opening 108. Further, when installed on the header 86, the semi-cylindrical holder portions 120, 122 delineate a longitudinal axis 124 that concentrically orientates the other components of the header assembly 50.

Referring back to FIG. 5, to provide for the clamshell style construction of the base filter 104, the first semi-cylindrical holder portion 120 has a first semi-cylindrical wall 126 with a first upper edge surface 128, with the first semi-cylindrical wall 126 being radially oriented with respect to the longitudinal axis 124. The arc formed by the first semi-cylindrical wall 126 may conclude in a first abutment surface 130 and a second abutment surface 132 that can be generally parallel to and offset from the longitudinal axis 124, though in other embodiments the abutment surfaces may have different angular orientations with respect to the longitudinal axis 124. The first upper edge surface 128 may be a smooth or flat surface that is perpendicular to the first semi-cylindrical wall 126 to allow the first semi-cylindrical holder portion 120 to abut against a bottom surface of the header flange 88. The perpendicular orientation of the first upper edge surface 128 can create right angle corners between the first upper edge surface 128 and the abutment surfaces 130, 132.

The second semi-cylindrical holder portion 122 has a complimentary configuration with a second semi-cylindrical wall 136 and a second upper edge surface 138. The arc formed by the second semi-cylindrical wall 136 concludes in a third abutment surface 140 and a fourth abutment surface 142 that correspond to the abutment surfaces 130, 132, respectively, of the first semi-cylindrical holder portion 120. The semi-cylindrical holder portions 120, 122 combine to form the cylindrical shape of the base filter 104 when the abutment surfaces 130, 132 are brought into contact and aligned with the abutment surfaces 140, 142 and the upper edge surfaces 128, 138 are aligned to form a circular upper edge of the base filter 104 about the longitudinal axis 124. Semi-annular clamp grooves 144, 146 in the semi-cylindrical walls 126, 136, respectively, may define the clamp groove 110 at a location longitudinally below the upper edge surfaces 128, 138.

Below the semi-annular clamp grooves 144, 146, the semi-cylindrical walls 126, 136 may have a plurality of reductant flow openings 148 to allow flow of the fluid reductant 34 there through. The reductant flow openings 148 may be circular, elliptical, ovoid or other shape having rounded edges to eliminate corners that may be able to catch and tear the DEF filter 102. As illustrated, the reductant flow openings 148 are arranged in a plurality of rings of flow openings 148 that are longitudinally spaced from each other, and with the flow openings 148 of each ring being circumferentially spaced about the semi-cylindrical walls 126, 136. With this arrangement, each flow opening 148 is longitudinally positioned above and/or below adjacent flow openings 148. Of course, the arrangement of the flow openings 148 is exemplary, and alternative arrangements, sizes and shapes of the reductant flow openings 148 are contemplated to meet flow requirements for a particular implementation of the filtration assembly 100.

Additional structures are provided on the semi-cylindrical holder portions 120, 122 to align the portions 120, 122 and secure the portions 120, 122 to each other. For example, the first abutment surface 130 has a first alignment rib 150 extending therefrom, and the second abutment surface 132 has a second alignment rib 152 extending therefrom. The alignment ribs 150, 152 follow the contours of the corresponding abutment surfaces 130, 132, respectively. On the second semi-cylindrical holder portion 122, a first alignment groove 154 is defined in the third abutment surface 140, and a second alignment groove 156 is defined in the fourth abutment surface 142. The alignment grooves 154, 156 follow the contours of the abutment surfaces 140, 142, respectively, and are configured to receive the alignment ribs 150, 152, respectively. When the base filter 104 is assembled, the alignment ribs 150, 152 are inserted into the corresponding alignment grooves 154, 156 and provide an interference fit that prevents the semi-cylindrical holder portions 120, 122 from moving relative to each other either longitudinally or transverse to the longitudinal axis 124.

To secure the semi-cylindrical holder portions 120, 122 to each other, the first semi-cylindrical holder portion 120 has a pair of first retention arms 160 extending outward generally perpendicular to the first abutment surface 130 and a pair of second retention arms 162 extending outward generally perpendicular to the second abutment surface 132. The retention arms 160, 162 are located longitudinally in the area of the reductant flow openings 148. Each of the retention arms 160, 162 includes a camming surface 164 on a radially outward side and extending from an end of the retention arm 160, 162 toward the corresponding abutment surface 130, 132 and terminating at a locking surface 166. The second semi-cylindrical holder portion 122 has a pair of first lock openings 168 through the second semi-cylindrical wall 136 proximate the third abutment surface 140, and corresponding first guide slots 170 in an inner surface of the second semi-cylindrical wall 136 that extend from the third abutment surface 140 to the first lock openings 168. A pair of second lock openings 172 extend through the second semi-cylindrical wall 136 and are connected to the fourth abutment surface 142 by corresponding second guide slots 174. When the semi-cylindrical holder portions 120, 122 are brought together, the retention arms 160, 162 are aligned with the corresponding guide slots 170, 174. The camming surfaces 164 are engaged by the second semi-cylindrical wall 136 at the guide slots 170, 174 to cause the retention arms 160, 162 to deflect inward. When the camming surfaces 164 are past the guide slots 170, 174 and within the lock openings 168, 172, the retention arms 160, 162 deflect back outward so that the locking surfaces 166 engage the surfaces defining the lock openings 168, 172 to secure the semi-cylindrical holder portions 120, 122 together with the alignment ribs 150, 152 disposed within the alignment grooves 154, 156.

The semi-cylindrical holder portions 120, 122 and the header 86 may be further configured for mounting the base filter 104 and self-aligning the semi-cylindrical holder portions 120, 122 on the header boss 90. The first semi-cylindrical holder portion 120 includes a first mounting tab 180, a second mounting tab 182 and a first fastener boss 184 extending inward from the inner surface of the first semi-cylindrical wall 126 proximate the first upper edge surface 128. Similarly, the second semi-cylindrical holder portion 122 includes a third mounting tab 186, a fourth mounting tab 188 and a second fastener boss 190 extending inward from the inner surface of the second semi-cylindrical wall 136 proximate the second upper edge surface 138. The mounting tabs 180, 182, 186, 188 are sized and positioned so that the base filter 104 may only be installed at one orientation relative to the header 86. The second mounting tab 182 is positioned relatively circumferentially outward from the first fastener boss 184 toward the second abutment surface 132, whereas the fourth mounting tab 188 is positioned relatively circumferentially inward proximate the second fastener boss 190 and away from the fourth abutment surface 142.

Figure 7:
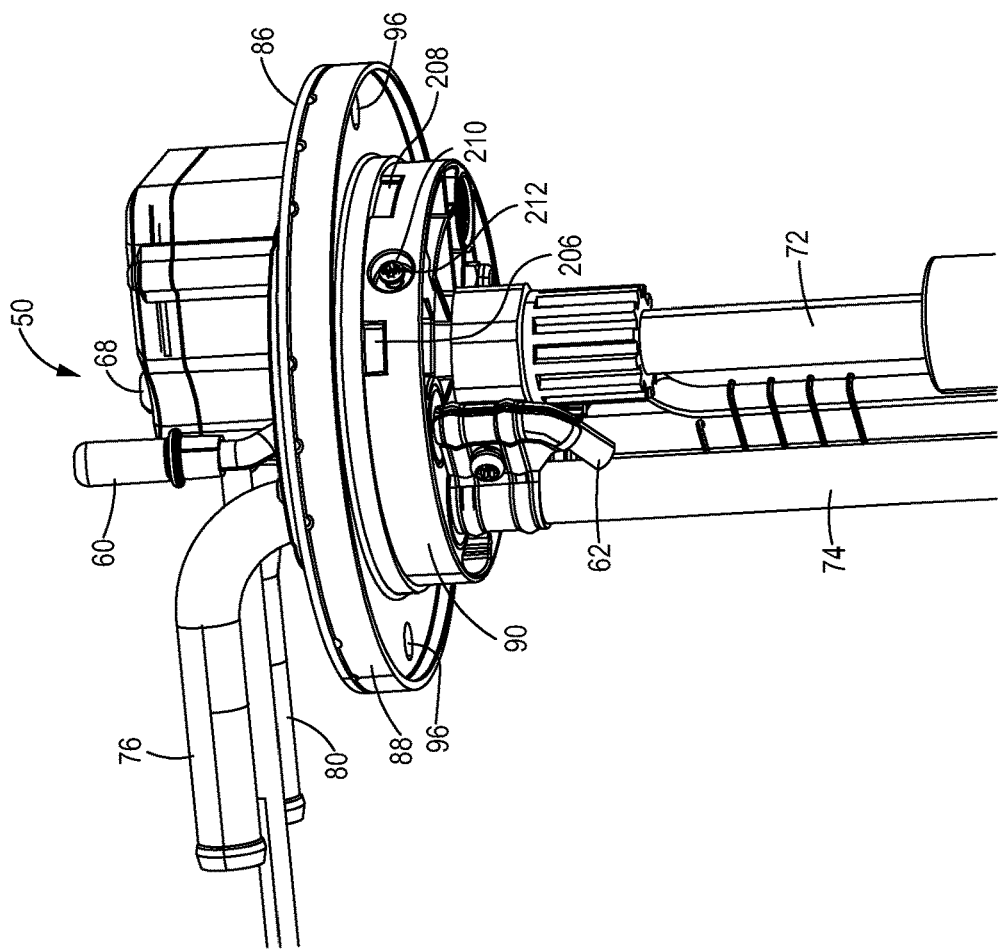
FIG. 7 is a perspective view of a second side of the upper portion of the header assembly of FIG. 3 with the DEF filter and the base filter removed.
Figure 6:
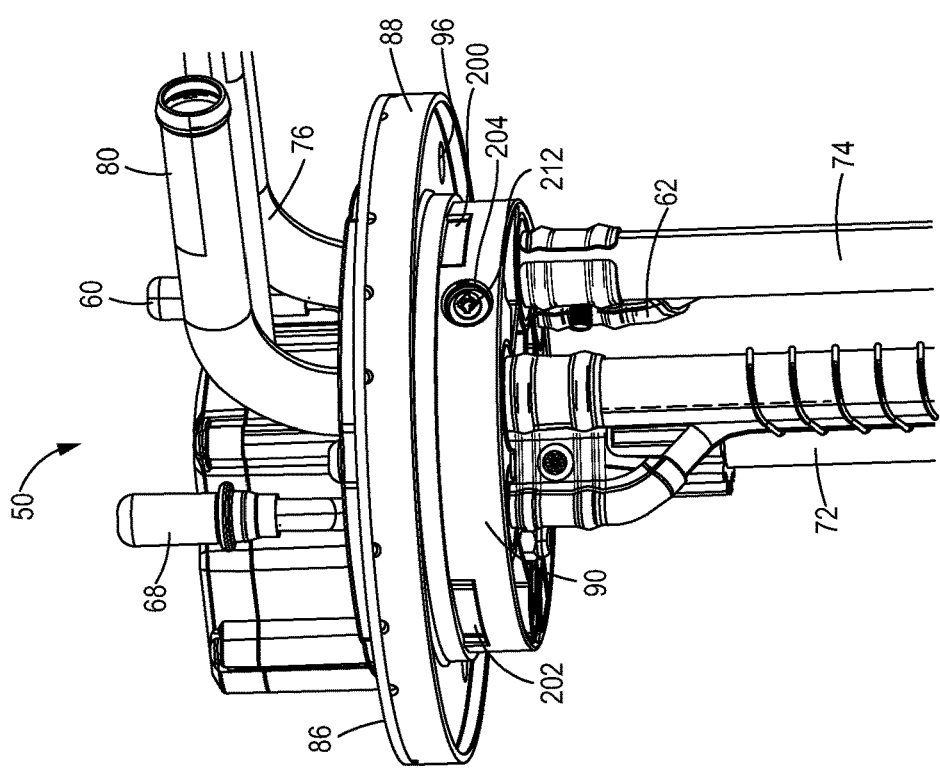
FIG. 6 is a perspective view of a first side of an upper portion of the header assembly of FIG. 3 with the DEF filter and the base filter removed.

The header boss 90 has a complimentary configuration to the semi-cylindrical holder portions 120, 122 as described above. Referring to FIG. 6, a first side of the header boss 90 has a first mounting recess 200, a second mounting recess 202 and a first fastener bore 204 in the outer surface and having positions corresponding to the locations of the mounting tabs 180, 182 and the first fastener boss 184 on the first semi-cylindrical wall 126. A second side of the header boss 90 shown in FIG. 7 includes a third mounting recess 206, a fourth mounting recess 208 and a second fastener bore 210 defined therein and positioned to correspond to the locations of the mounting tabs 186, 188 and the second fastener boss 190 on the second semi-cylindrical wall 136. During installation of the base filter 104 of this embodiment, the first semi-cylindrical holder portion 120 must be aligned with the header 86 so that the mounting tabs 180, 182 are received into the corresponding mounting recesses 200, 202, respectively. When the second semi-cylindrical holder portion 122 is brought into alignment with the first semi-cylindrical holder portion 120, the mounting tabs 186, 188 are received into the mounting recesses 206, 208, respectively. This alignment also allows the retention arms 160, 162 to be received into the guide slots 170, 174 and seated in the lock openings 168, 172. Of course, the second semi-cylindrical holder portion 122 may be installed on the header boss 90 before the first semi-cylindrical holder portion 120, or the semi-cylindrical holder portions 120, 122 may be brought together on the header boss 90 at the same time. With the semi-cylindrical holder portions 120, 122 mounted on the header boss 90 and connected to each other, fasteners 212 can be screwed into the fastener bosses 184, 190 and the fastener bores 204, 210. Installation of the filtration assembly 100 on the header 86 is then completed by sliding the DEF filter opening 108 over the base filter 104 up to the clamp groove 110 and tightening a band clamp 112 down around the DEF filter opening 108 to secure the upper end of the DEF filter 102 within the clamp groove 110. The self-aligning embodiment of the header 86 and the base filter 104 illustrated and described herein is exemplary. Those skilled in the art will understand that the mounting tabs and mounting recesses may be configured and positioned in any manner to implement a desired number of discrete positions of the base filter 104 relative to the header boss 90, and such alternatives are contemplated by the inventors.

INDUSTRIAL APPLICABILITY

The base filter 104 in accordance with the present disclosure assists in ensuring proper functioning of the header assembly 50 without interference from a collapsing DEF filter 102, and proper filtration by the filtration assembly 100. The base filter 104 covers the area within the DEF filter 102 between the header 86 and the heater coil 78 to maintain the cylindrical shape of the DEF filter 102. By preventing collapse of the DEF filter 102, the base filter 104 allows free movement of the reductant level sensor 70 to ensure accurate measurement of the amount of fluid reductant 34 in the DEF reservoir 38.

The clamshell-style construction for the base filter 104 results in the creation of tight seams between the semi-cylindrical holder portions 120, 122 that prevent the fluid reductant 34 from bypassing the DEF filter 102 and thereby prevent any debris or contaminants in the fluid reductant 34 from avoiding filtration and enabling the DEF filter 102 to remove these materials before they can be passed downstream to other elements of the exhaust aftertreatment system 12. The retention arms 160, 162 draw the abutment surfaces 130, 132, 140, 142 together in tight contact. In addition to aligning the semi-cylindrical holder portions 120, 122, the alignment ribs 150, 152 within the alignment grooves 154, 156 may form a barrier to prevent the debris or contaminants from passing through the seams created by the mating abutment surfaces 130, 132, 140, 142.

Taken together, the features of the base filter 104 disclosed herein may facilitate initial installation of the header assembly 50 and the filtration assembly 100, as well as after-market replacement of components, to help ensure the continuous operation of the machine 10.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A base filter for a diesel exhaust fluid (DEF) filter of a header assembly in a fluid reservoir, wherein the header assembly includes a header having a cylindrical header boss with a boss outer surface having a first mounting recess, a second mounting recess, a third mounting recess and a fourth mounting recess defined therein, the base filter comprising:
    a first semi-cylindrical holder portion having a first semi-cylindrical wall with a first upper edge surface, the first semi-cylindrical wall concluding at a first abutment surface and a second abutment surface, wherein the first semi-cylindrical holder portion has a first mounting tab and a second mounting tab extending inward from an inner surface of the first semi-cylindrical wall proximate the first upper edge surface; and
    a second semi-cylindrical holder portion having a second semi-cylindrical wall with a second upper edge surface, the second semi-cylindrical wall concluding in a third abutment surface and a fourth abutment surface, wherein the second semi-cylindrical holder portion has a third mounting tab and a fourth mounting tab extending inward from an inner surface of the second semi-cylindrical wall proximate the second upper edge surface,
    wherein the first mounting tab and the second mounting tab are circumferentially spaced about the first semi-cylindrical wall to align with and be inserted into the first mounting recess and the second mounting recess, respectively, of the boss outer surface, and wherein the third mounting tab and the fourth mounting tab are circumferentially spaced about the second semi-cylindrical wall to align with and be inserted into the third mounting recess and the fourth mounting recess, respectively, of the boss outer surface.

2. The base filter of claim 1, wherein the first mounting tab, the second mounting tab, the third mounting tab and the fourth mounting tab are circumferentially space about the first semi-cylindrical wall and the second semi-cylindrical wall so that the base filter can only be mounted on the header when the first mounting tab is inserted into the first mounting recess, the second mounting tab is inserted into the second mounting recess, the third mounting tab is inserted into the third mounting recess, and the fourth mounting tab is inserted into the fourth mounting recess.

3. The base filter of claim 1, wherein the boss outer surface has a first fastener bore and a second fastener bore defined therein, wherein the first semi-cylindrical holder portion has a first fastener boss extending inward from the inner surface of the first semi-cylindrical wall proximate the first upper edge surface and circumferentially positioned on the first semi-cylindrical wall to align with the first fastener bore of the boss outer surface when the first mounting tab is inserted into the first mounting recess and the second mounting tab is inserted into the second mounting recess, and wherein the second semi-cylindrical holder portion has a second fastener boss extending inward from the inner surface of the second semi-cylindrical wall proximate the second upper edge surface and circumferentially positioned on the second semi-cylindrical wall to align with the second fastener bore of the boss outer surface when the third mounting tab is inserted into the third mounting recess and the fourth mounting tab is inserted into the fourth mounting recess.

4. The base filter of claim 1, wherein the first semi-cylindrical holder portion includes a first alignment rib extending outward from the first abutment surface and a second alignment rib extending outward from the second abutment surface, wherein the second semi-cylindrical holder portion includes a first alignment groove defined in the third abutment surface and a second alignment groove defined in the fourth abutment surface, wherein the first alignment rib and the second alignment rib are disposed within and engaged by the first alignment groove and the second alignment groove, respectively, when the base filter is assembled on the cylindrical header boss to prevent relative movement between the first semi-cylindrical holder portion and the second semi-cylindrical holder portion in a longitudinal direction and in a transverse direction relative to a longitudinal axis of the base filter.

5. The base filter of claim 1, wherein the first semi-cylindrical holder portion has a first semi-annular groove defined in an outer surface of the first semi-cylindrical wall and the second semi-cylindrical holder portion has a second semi-annular groove defined in an outer surface of the second semi-cylindrical wall, and wherein the first semi-annular groove and the second semi-annular groove define an annular clamp groove when the base filter is assembled on the cylindrical header boss.

6. The base filter of claim 1, wherein the first semi-cylindrical holder portion has a first plurality of reductant flow openings extending through the first semi-cylindrical wall and the second semi-cylindrical holder portion has a second plurality of reductant flow openings extending through the second semi-cylindrical wall.

7. The base filter of claim 1, wherein the first semi-cylindrical holder portion includes a first retention arm extending outward from the first abutment surface and a second retention arm extending outward from the second abutment surface, wherein the second semi-cylindrical holder portion includes a first lock opening through the second semi-cylindrical wall proximate the third abutment surface and a second lock opening through the second semi-cylindrical wall proximate the fourth abutment surface, wherein ends of the first retention arm and the second retention arm are disposed within the first lock opening and the second lock opening, respectively, when the base filter is assembled on the cylindrical header boss to secure the first semi-cylindrical holder portion to the second semi-cylindrical holder portion.

8. The base filter of claim 7, wherein the first retention arm and the second retention arm each have a camming surface and a locking surface, wherein the camming surfaces are engaged by the second semi-cylindrical wall to cause the first retention arm and the second retention arm to deflect inward, and the locking surfaces are engaged by edges defining the first lock opening and the second lock opening when the ends of the first retention arm and the second retention arm are disposed within the first lock opening and the second lock opening.

9. The base filter of claim 7, wherein the second semi-cylindrical holder portion includes a first guide slot defined in the inner surface of the second semi-cylindrical wall and extending from the third abutment surface to the first lock opening and a second guide slot defined in the inner surface of the second semi-cylindrical wall and extending from the fourth abutment surface to the second lock opening, wherein the first guide slot and the second guide slot engage the first retention arm and the second retention arm, respectively, and guide the ends of the first retention arm and the second retention arm into the first lock opening and the second lock opening, respectively.

10. A header assembly insertable into a fluid reservoir for reductant fluid, the header assembly comprising:
a header including a header flange having a flange outer diameter, and a header boss descending from the header flange having a boss outer surface with a boss outer diameter that is less than the flange outer diameter of the header flange, the boss outer surface having a first mounting recess and a second mounting recess defined therein;
a base filter comprising:
a first semi-cylindrical holder portion having a first semi-cylindrical wall with a first upper edge surface, the first semi-cylindrical wall concluding at a first abutment surface and a second abutment surface, wherein the first semi-cylindrical holder portion has a first mounting tab extending inward from an inner surface of the first semi-cylindrical wall proximate the first upper edge surface, and
a second semi-cylindrical holder portion having a second semi-cylindrical wall with a second upper edge surface, the second semi-cylindrical wall concluding in a third abutment surface and a fourth abutment surface, and wherein the second semi-cylindrical holder portion has a second mounting tab extending inward from an inner surface of the second semi-cylindrical wall proximate the second upper edge surface,
wherein the first mounting tab and the second mounting tab are circumferentially spaced about the first semi-cylindrical wall and the second semi-cylindrical wall, respectively, to align with and be inserted into the first mounting recess and the second mounting recess, respectively, of the boss outer surface when the base filter is assembled on the header boss with the first abutment surface facing and engaging the third abutment surface and the second abutment surface facing and engaging the fourth abutment surface; and
a diesel exhaust fluid (DEF) filter secured to the base filter and descending from the header.

11. The header assembly of claim 10, wherein the first semi-cylindrical holder portion has a first semi-annular groove defined in an outer surface of the first semi-cylindrical wall and the second semi-cylindrical holder portion has a second semi-annular groove defined in an outer surface of the second semi-cylindrical wall, wherein the first semi-annular groove and the second semi-annular groove define an annular clamp groove when the base filter is assembled on the header boss, wherein a DEF filter opening of the DEF filter slides over the base filter up to the annular clamp groove, and wherein the header assembly comprises a band clamp installed over the base filter and tightened around the DEF filter opening within the annular clamp groove to secure the DEF filter to the base filter.

12. The header assembly of claim 10, wherein the first semi-cylindrical holder portion includes a first alignment rib extending outward from the first abutment surface and a second alignment rib extending outward from the second abutment surface, wherein the second semi-cylindrical holder portion includes a first alignment groove defined in the third abutment surface and a second alignment groove defined in the fourth abutment surface, wherein the first alignment rib and the second alignment rib are disposed within and engaged by the first alignment groove and the second alignment groove, respectively, when the base filter is assembled on the header boss to prevent relative movement between the first semi-cylindrical holder portion and the second semi-cylindrical holder portion in a longitudinal direction and in a transverse direction relative to a longitudinal axis of the base filter.

13. The header assembly of claim 10, wherein the boss outer surface has a third mounting recess and a fourth mounting recess defined therein, wherein the first semi-cylindrical holder portion has a third mounting tab extending inward from the inner surface of the first semi-cylindrical wall proximate the first upper edge surface and the first mounting tab and the third mounting tab are circumferentially spaced about the first semi-cylindrical wall to align with and be inserted into the first mounting recess and the third mounting recess, respectively, of the boss outer surface, wherein the second semi-cylindrical holder portion has a fourth mounting tab extending inward from the inner surface of the second semi-cylindrical wall proximate the second upper edge surface and the second mounting tab and the fourth mounting tab are circumferentially spaced about the second semi-cylindrical wall to align with and be inserted into the second mounting recess and the fourth mounting recess, respectively, of the boss outer surface.

14. The header assembly of claim 10, wherein the first semi-cylindrical holder portion includes a first retention arm extending outward from the first abutment surface and a second retention arm extending outward from the second abutment surface, wherein the second semi-cylindrical holder portion includes a first lock opening through the second semi-cylindrical wall proximate the third abutment surface and a second lock opening through the second semi-cylindrical wall proximate the fourth abutment surface, wherein ends of the first retention arm and the second retention arm are disposed within the first lock opening and the second lock opening, respectively, when the base filter is assembled on the header boss to secure the first semi-cylindrical holder portion to the second semi-cylindrical holder portion.

15. The header assembly of claim 10, comprising a heater device having a coolant inlet conduit extending downward from the header to a helical heater coil disposed proximate a bottom surface of the fluid reservoir, wherein the coolant inlet conduit extends through the base filter when the base filter is assembled on the header boss, and the base filter extends from the header boss downward to the helical heater coil.

16. A base filter for a diesel exhaust fluid (DEF) filter of a header assembly in a fluid reservoir, wherein the header assembly includes a header having a cylindrical header boss with a boss outer surface having a first mounting recess and a second mounting recess defined therein, the base filter comprising:
 a first semi-cylindrical holder portion having a first semi-cylindrical wall concluding at a first abutment surface and a second abutment surface, wherein the first semi-cylindrical holder portion has a first mounting tab extending inward from an inner surface of the first semi-cylindrical wall;
 a second semi-cylindrical holder portion having a second semi-cylindrical wall concluding in a third abutment surface and a fourth abutment surface, wherein the second semi-cylindrical holder portion has a second mounting tab extending inward from an inner surface of the second semi-cylindrical wall;
 wherein the first mounting tab and the second mounting tab are circumferentially spaced about the first semi-cylindrical wall and the second semi-cylindrical wall to align with and be inserted into the first mounting recess and the second mounting recess, respectively, of the boss outer surface when the base filter is assembled on the cylindrical header boss with the first abutment surface facing and engaging the third abutment surface and the second abutment surface facing and engaging the fourth abutment surface.

17. The base filter of claim 16, wherein the first mounting tab and the second mounting tab are circumferentially space about the first semi-cylindrical wall and the second semi-cylindrical wall, respectively, so that the base filter can only be mounted on the header when the first mounting tab is inserted into the first mounting recess and the second mounting tab is inserted into the second mounting recess.

18. The base filter of claim 16, wherein the boss outer surface has a third mounting recess and a fourth mounting recess defined therein, wherein the first semi-cylindrical holder portion has a third mounting tab extending inward from the inner surface of the first semi-cylindrical wall and the first mounting tab and the third mounting tab are circumferentially spaced about the first semi-cylindrical wall to align with and be inserted into the first mounting recess and the third mounting recess, respectively, of the boss outer surface, wherein the second semi-cylindrical holder portion has a fourth mounting tab extending inward from the inner surface of the second semi-cylindrical wall and the second mounting tab and the fourth mounting tab are circumferentially spaced about the second semi-cylindrical wall to align with and be inserted into the second mounting recess and the fourth mounting recess, respectively, of the boss outer surface.

19. The base filter of claim 16, wherein the first semi-cylindrical holder portion includes a first alignment rib extending outward from the first abutment surface and a second alignment rib extending outward from the second abutment surface, wherein the second semi-cylindrical holder portion includes a first alignment groove defined in the third abutment surface and a second alignment groove defined in the fourth abutment surface, wherein the first alignment rib and the second alignment rib are disposed within and engaged by the first alignment groove and the second alignment groove, respectively, when the base filter is assembled on the cylindrical header boss to prevent relative movement between the first semi-cylindrical holder portion and the second semi-cylindrical holder portion in a longitudinal direction and in a transverse direction relative to a longitudinal axis of the base filter.

20. The base filter of claim 16, wherein the first semi-cylindrical holder portion has a first plurality of reductant flow openings extending through the first semi-cylindrical wall and the second semi-cylindrical holder portion has a second plurality of reductant flow openings extending through the second semi-cylindrical wall.

* * * * *